United States Patent

Krebs

[11] 4,052,318
[45] Oct. 4, 1977

[54] MESH COFFEE FILTER

[76] Inventor: Bonnie E. Krebs, No. 84 Countryside Village, Great Falls, Mont. 59404

[21] Appl. No.: 703,429

[22] Filed: July 8, 1976

[51] Int. Cl.² .................................................. B01D 25/02
[52] U.S. Cl. ............................. 210/337; 210/470; 210/489
[58] Field of Search ............... 210/232, 337, 339, 470, 210/483, 489, 499

[56] References Cited

U.S. PATENT DOCUMENTS

| | | | |
|---|---|---|---|
| 3,280,985 | 10/1966 | Czerwonka | 210/489 |
| 3,388,804 | 6/1968 | Hester | 210/470 |
| 3,478,498 | 11/1969 | Sauermann | 210/489 X |
| 3,836,464 | 9/1974 | Brookins et al. | 210/489 X |

FOREIGN PATENT DOCUMENTS

| | | | |
|---|---|---|---|
| 666,111 | 7/1963 | Canada | 210/489 |
| 642,983 | 3/1937 | Germany | 210/162 |

Primary Examiner—William A. Cuchlinski, Jr.
Attorney, Agent, or Firm—Leonard W. Suroff

[57] ABSTRACT

A filter assembly is disclosed for use in coffee makers in which a pair of filters are supported on carrier means with the filters held firmly in place by securing means. The filters may be reused and reassembled on the carrier means with handle means associated with each filter so as to obtain the necessary grip on a filter to overcome the frictional engagement between the filter and the securing means.

9 Claims, 3 Drawing Figures

4,052,318

MESH COFFEE FILTER

BACKGROUND OF THE INVENTION

The present invention relates to filters and more particularly to filters for use with coffee makers.

In the brewing of coffee, filters are used and for most home coffee makers a paper filter is used. This disposable filter is costly to the user and also is a waste of paper that is not recycled.

OBJECTS OF THE INVENTION

An object of the present invention is the provision of an improved filter assembly that may be reused and perform an efficient filter action.

Anoher object of the invention is to provide a filter assembly that will rapidly and effectively filter a coffee solution containing finely ground coffee and be reuseable.

Other objects and advantages will become apparent as the disclosure proceeds.

SUMMARY OF THE INVENTION

A filter is disclosed for use in a hot beverage making machine of the type where the hot beverage has grounds and fines which must be separated from the hot beverage. The filter includes a fine mesh top filter with a fine mesh bottom filter positioned on opposite sides of carrier means adapted to be positioned between the top and bottom filters and permit the hot beverage to pass therethrough.

Securing means is provided to maintain the top and bottom filters in fixed relation to the carrier means across the complete area defined by the filters, so as to permit the filters to be removed for cleaning or replacement when a force of predetermined magnitude is manually applied to overcome the frictional engagement between the securing means and the filters.

Handle means associated with each filter is provided so as to obtain the necessary grip on a filter to overcome the frictional engagement between the filter and the securing means. The securing means includes a plurality of hinges connected at one end thereof to the carrier means and extending on both sides thereof, with locking members formed at the free end of each of the hinges and having an enlarged head portion adapted to extend into the mesh filters in interlocking relation therewith.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE PREFERRED EMBODIMENT

Figure 1:
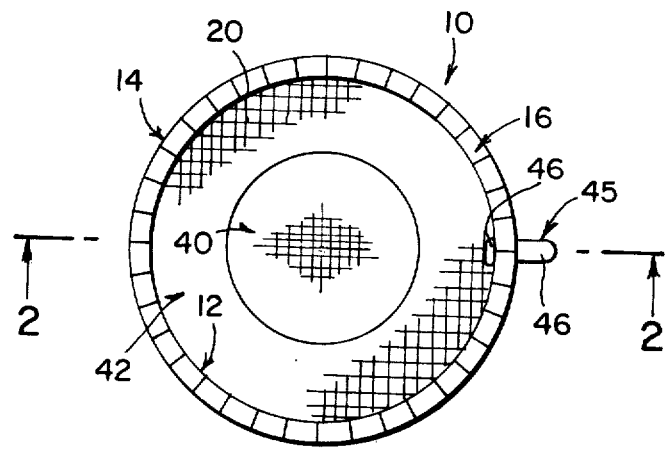
FIG. 1 is a top view of a filter assembly in accordance with the present invention.
Figure 2:
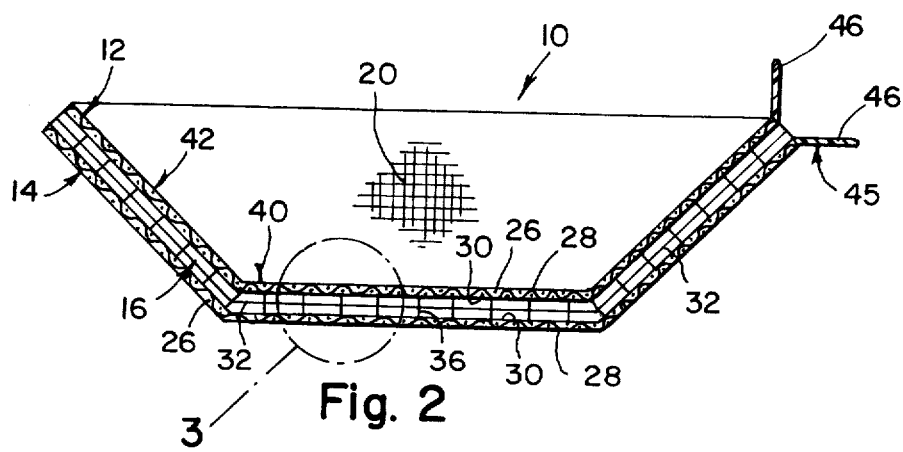
FIG. 2 is a sectional view of the filter assembly taken along the line 2—2 of FIG. 1.
Figure 3:
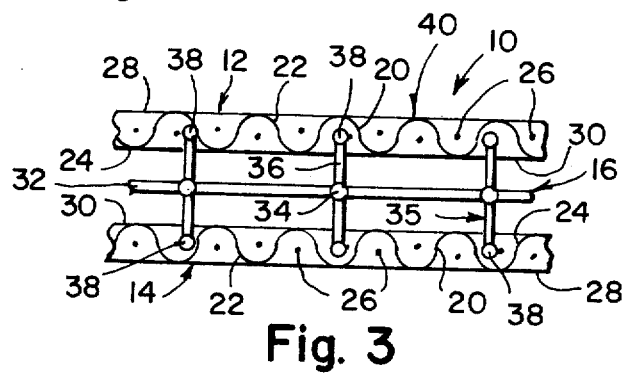
FIG. 3 is an enlarged view of the encircled portion of the filter assembly as indicated in FIG. 2.

FIGS. 1-3 illustrate a filter 10 that may be utilized in a hot beverage making machine of the type where the hot beverage has grounds and fines which must be separated from the hot beverage prior to drinking of the beverage. The filter 10 may include a top filter 12 and a bottom filter 14 that are spaced from each other in a manner hereinafter described. By the utilization of two filters it is possible to filter the beverage twice such that any grounds not entrapped by the top filter 12 may be entrapped by the bottom filter 14. The filters 12 and 14 may be of the same size or the upper filter 12 may be of a larger mesh size than the bottom filter 14.

Carrier means 16 is adapted to be positioned between the top filter 12 and the bottom filter 14 and permit the hot beverage to pass therethrough. The filter 12 and 14 may be of the type in which a woven mesh is formed including a plurality of filaments 20 that as seen in FIG. 3 extends in one direction and includes spaced apart upper curved portions 22 and lower curved portions 24 that are merged together and extend across the width of the filter. Extending transversely with the filaments 20 are filaments 26 which may be similarly formed such that an upper surface 28 and lower surface 30 is formed on each respective filter 12 and 14. The carrier 16 is formed of a plurality of cross members 32 and 34 extending transversely of each other with the filaments 34 extending in the plane of the drawing as illustrated in FIG. 3.

In order to permit the filters 12 and 14 to be placed in assembled relation with carrier 16 securing means 35 is provided. The purpose of the securing means is to maintain the top filter 12 and bottom filter 14 in fixed relation to the carrier means 16 across the complete area defined by the filters. The filters may be made of metal, plastic or even paper and the selection of the material is dependent on the number of uses desired before replacement of the filters. Accordingly, the securing means 35 permits the filters to be removed for cleaning or disposal with the subsequent replacement with new filters and the carrier means 16 being reused.

It is desired that the filters 12 and 14 do not loosen during usage and accordingly the interrelationship is such that a force of predetermined magnitude has to be manually applied to overcome the frictional engagement between the securing means 35 and the filters 12 and 14. The securing means 35 includes a plurality of vertically extending hinges 36 that are connected at one end thereof to the carrier means 16 as by securement to the juncture of the filaments 32 and 34. The hinges 36 may extend outwardly from both sides of the carrier means 16 when it is desired to use two filters. If one filter is desired then the securing means 35 may be adapted to retain one filter in releasably fixed position to the carrier means 16.

Associated with each hinge 36 is a locking member 38 positioned at the free end thereof and having an enlarged spherical head portion adapted to extend into and between the curved portion 22 and the transverse filament 26 of the filter. In this manner the head portion 38 extends in interlocking relation such that a positive force is required to separate one from the other. The spherical head member 38 is selected having a diameter greater than the spacing between the transversely extending filaments 20 and 26.

By forming the carrier means 16 into a meshlike screen the hinges 36 may be secured or coupled thereto at the intersection of the cross members 32 and 34. The carrier means 16 and securing means 35 may be formed of metal or some other material and if desired may be integrally formed as by injection moulding. In this manner the hinges 36 are flexible and can be forced into the interlocking relationship illustrated in FIG. 3.

The filter may have a planar central portion 40 and a peripherally extending inclined wall 42 to which the filters 12 and 14, carrier means 16, and securing means 35 will conform. The user depending upon the make and model of coffee maker in use by him or her may form the filter 10 to a desired configuration or the filter 10 may be manufactured of specific sizes intended for specific coffee makers.

To facilitate separation of the filters 12 and 14 from the securing means 35 handle means 45 is provided and may be in the form of outwardly extending tabs 46 associated with each of the filters. The tabs 46 permit the user to have the necessary grip on a filter to overcome the frictional engagement between the filter and the securing means as previously discussed. The actual size of the filters 12 and 14 may be selected from sizes well known in the art such that the desired degree of filtering can be accomplished without clogging the coffee liquid that is filtered therethrough.

Although an illustrative embodiment of the invention has been described in detail herein with reference to the accompanying drawings, it is to be understood that the invention is not limited to the precise embodiment, and that various changes and modifications may be effected therein without departing from the scope or spirit of the invention.

I claim:

1. A filter for use in a hot beverage making machine of the type where the hot beverage has grounds and fines which must be separated from the hot beverage comprising:
   A. a fine mesh top filter,
   B. a fine mesh bottom filter,
   C. carrier means adapted to be positioned between said top and bottom filters and permit the hot beverages to pass therethrough,
   D. securing means to provide said top and bottom filters in fixed relation to said carrier means across the complete area defined by said filters, so as to permit said filters to be removed for cleaning or replacement when a force of predetermined magnitude is manually applied to overcome the frictional engagement between said securing means and said filters, and
   E. said securing means includes:
      1. a plurality of hinges connected at one end thereof to said carrier means and extending on both sides thereof, and
      2. locking members formed at the free end of each of said hinges and having an enlarged head portion adapted to extend into said mesh filters in interlocking relation therewith.

2. A filter as defined in claim 1, and further including handle means associated with each filter so as to obtain the necessary grip on a filter to overcome the frictional engagement between said filter and said securing means.

3. A filter as defined in claim 1,
   A. wherein said filters are woven from filaments having filaments extending transversely to each other, and
   B. wherein said head portion of said hinges is adapted to fit into said filaments in interlocking frictional relation therewith.

4. A filter as defined in claim 3, wherein said head portion forms a spherical member having a diameter greater than the spacing between said transversely extending filaments.

5. A filter as defined in claim 1, wherein said carrier is formed of cross members to form a mesh like screen with said hinges coupled thereto at the intersection of said cross members.

6. A filter as defined in claim 1, wherein said top filter is of a larger screen size than said bottom filter, such that any grounds and fines not filtered by said top filter is separated from the beverage by said bottom filter and the grounds and fines remaining between said filters.

7. A filter as defined in claim 1, wherein said filter is flexible and can be formed by the user to conform to the shape of the coffee machine with a planar central portion and a peripherally extending inclined wall.

8. A filter for use in a hot beverage making machine of the type where the hot beverage has gounds and fines which must be separated from the hot beverage comprising:
   A. a fine mesh top filter,
   B. a fine mesh bottom filter,
   C. carrier means adapted to be positioned between said top and bottom filters and permit the hot beverages to pass therethrough,
   D. securing means to provide said top and bottom filters in fixed relation to said carrier means across the complete area defined by said filters, so as to permit said filters to be removed for cleaning or replacement when a force of predetermined magnitude is manually applied to overcome the frictional engagement between said securing means and said filters,
   E. said securing means includes:
      i. a plurality of hinges connected at one end thereof to said carrier means and extending on both sides thereof, and
      ii. locking members formed at the free end of each of said hinges and having an enlarged head portion adapted to extend into said mesh filters in interlocking relation therewith,
   F. said filters are woven having filaments extending transversely to each other,
   G. said head portion of said hinges is adapted to fit into said filaments in interlocking frictional relation therewith,
   H. said head portion forms a spherical member having a diameter greater than the spacing between said transversely extending filaments, and
   I. said carrier is formed of cross members to form a mesh like screen with said hinges coupled thereto at the intersection of said cross members.

9. A filter as defined in claim 8, wherein said filter is flexible and can be formed by the user to conform to the shape of the coffee machine with a planar central portion and a peripherally extending inclined wall.

* * * * *